United States Patent [19]

Heckley et al.

[11] 4,075,822
[45] Feb. 28, 1978

[54] CROP CONDITIONER ROLL STRUCTURE

[75] Inventors: Warner M. Heckley, Rockford; Gerald F. Richards, Celina, both of Ohio

[73] Assignee: Avco Corporation, Coldwater, Ohio

[21] Appl. No.: 637,190

[22] Filed: Dec. 3, 1975

Related U.S. Application Data

[63] Continuation of Ser. No. 514,213, Oct. 11, 1974, abandoned.

[51] Int. Cl.² ............................................. A01D 49/00
[52] U.S. Cl. ..................................... 56/1; 56/DIG. 1
[58] Field of Search ............. 56/1, DIG. 1; 100/70 A

[56] References Cited

U.S. PATENT DOCUMENTS

| | | | |
|---|---|---|---|
| 2,921,426 | 1/1960 | Heth | 56/DIG. 1 |
| 2,992,523 | 7/1961 | Oppel | 56/DIG. 1 |
| 3,039,256 | 6/1962 | Witt | 56/DIG. 1 |
| 3,086,344 | 4/1963 | McCarty | 56/DIG. 1 |
| 3,513,645 | 5/1970 | Garrett et al. | 56/DIG. 1 |

*Primary Examiner*—Jay N. Eskovitz
*Attorney, Agent, or Firm*—Charles M. Hogan

[57] ABSTRACT

A novel combination of a resilient upper roller having circumferentially spaced rib formations and a rigid lower roller having complementary rib formations. The formations are spiral or herringbone-like and register rib-to-rib while the conditioner provides a crushing action. The rolls are driven in timed synchronism.

3 Claims, 7 Drawing Figures

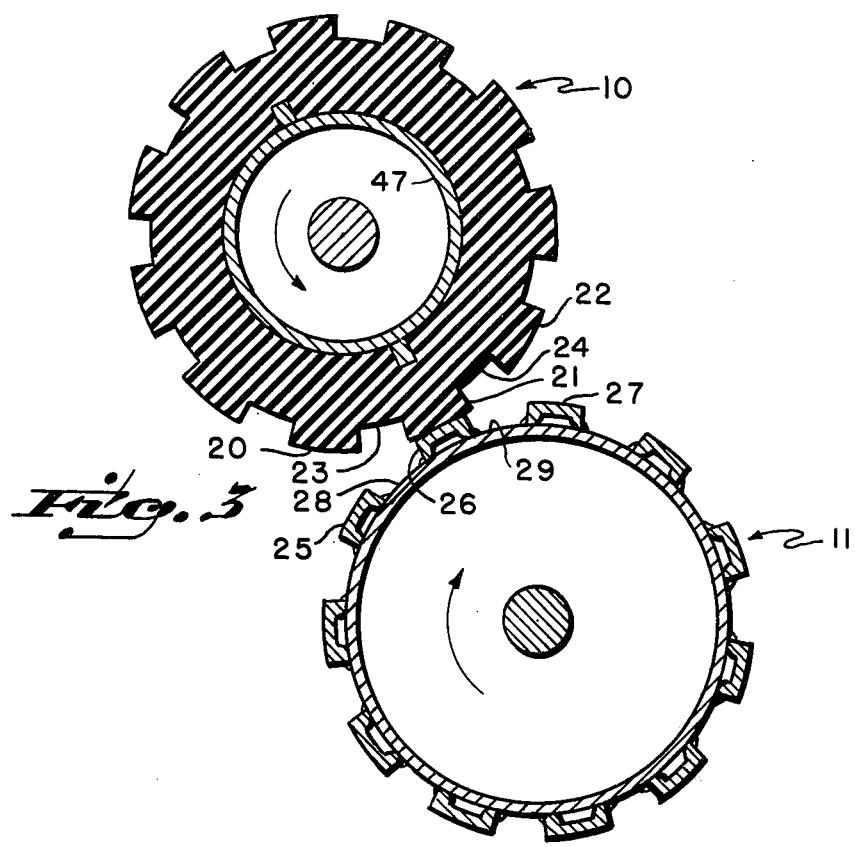
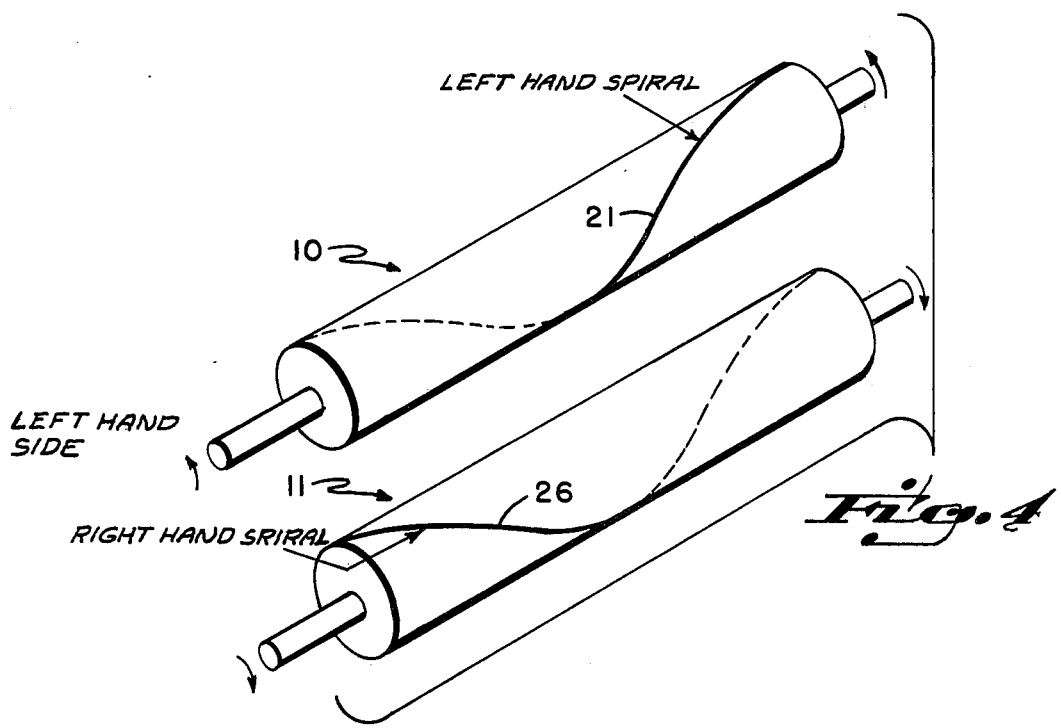

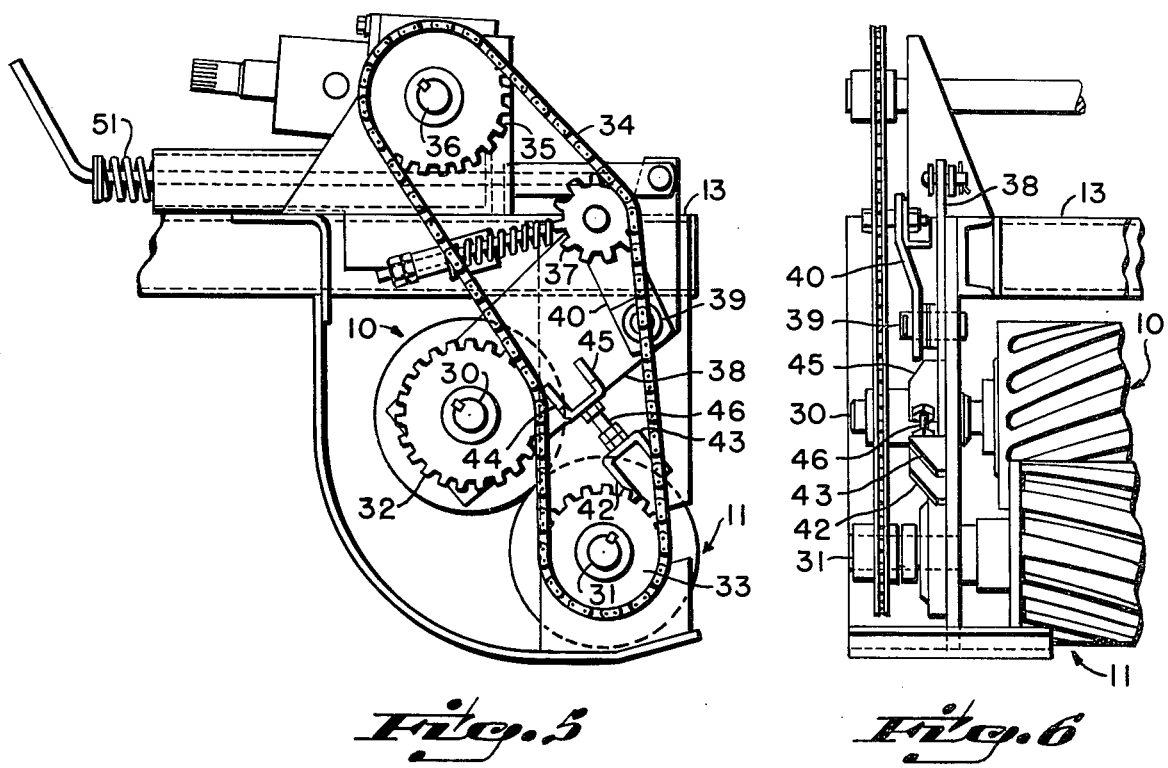
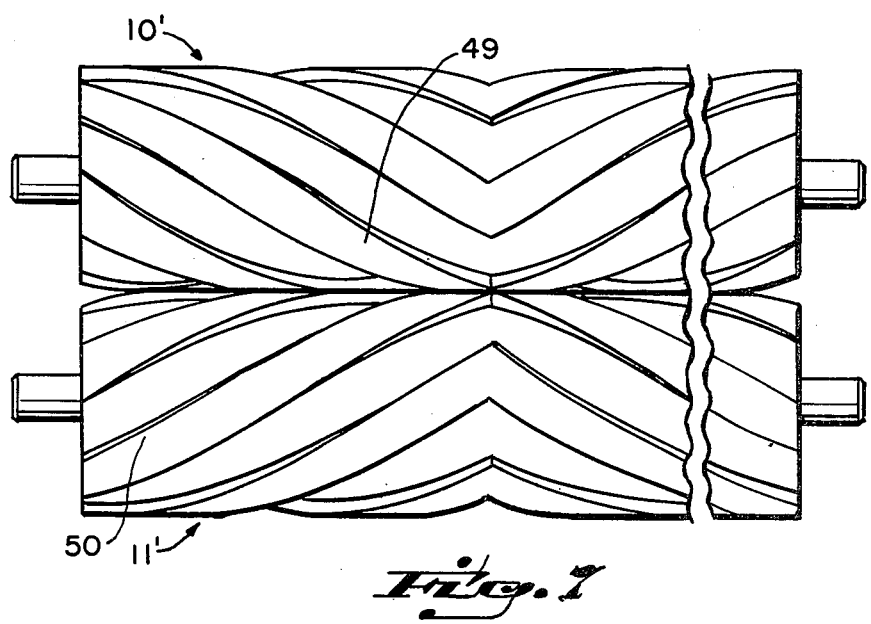

CROP CONDITIONER ROLL STRUCTURE

BACKGROUND OF THE INVENTION

Field of the Invention

This patent application is a continuation of our parent application, Ser. No. 514,213, filed in the United States Patent Office on Oct. 11, 1974, entitled "Crop Conditioner Roll Structure", and now abandoned.

The present invention comprises a novel and improved pressure roll structure for crop conditioning equipment.

A conventional practice in known hay conditioners is to provide two pressure rolls. These are power driven in opposite directions of rotation so that mowed crop stalks are grasped and passed between the rolls. One roller is rotatably mounted on a fixed axis and the other roller is adjustably mounted so that the axes of the rolls can be relatively spaced to control the degree of crop compression and to accommodate varying amounts of material.

The above-described operation is commonly referred to as "hay conditioning." Many years ago agricultural science found that drying of mowed hay crops in the field could be hastened, with resultant reduction in weather damage, by crushing of the crop stems. This operation substantially reduces the length of time required for drying of the stems and tends to equate that length to the time required for drying of the leaves, whereby harvesting time is reduced and an improved crop produced.

Various roll configurations have been employed in efforts to process the crop and crack the wax covering of the stems in such manner that the stems are not chopped into short pieces and the leaves are not crushed and severed.

In some cases the rollers are so designed that fins intermesh so that hay stalk stems are cracked open transversely at spaced sections. This type of conditioning is referred to as "crimping". Rollers of this character clutch and crack vigorously. However, they do not operate smoothly and do not squeeze out moisture continuously along the stems.

Another type of conditioning, known as "crushing", utilizes smooth rolls which crush the individual hay stalk stems along their full length, leaving no residual sections of concentrated moisture. This type of operation is not as effective as crimping as far as feeding, grasping and clutching the stalks is concerned. The present invention provides a conditioning roll structure which combines, in an improved manner, the advantages of both crimping and crushing operations.

Description of the Prior Art

The prior art patent literature on hay conditioner roller structures is quite extensive. Representative United States patents issued in United States Patent Office Class 56, subclass 1. For example, the U.S. patent to Hale, U.S. Pat. No. 3,488,929, issued Jan. 13, 1970, discloses an arrangement in which each of the two identical rolls is provided with alternate spiral ribs or lands and recesses or grooves. The spiral formations of the respective rolls are complementary and have equal but opposite angular pitch. The rolls cooperate by meshing of the ribs of each with grooves on the other. The U.S. patent to Garrett and Korff, U.S. Pat. No. 3,513,645, issued May 26, 1970, discloses a similar structure, both rolls being made of elastomer.

Particular attention is invited to FIG. 10 of the United States patent to Oppel, U.S. Pat. No. 2,992,523, issued July 18, 1961, wherein metallic bars on the rolls register to provide a crushing action. Crimping action is suggested as an alternate mode of operation and this is accomplished by a relative phase displacement or staggering of the two rolls so that the bars are taken out of registry.

In the hay conditioner of Harrer and Shannon, U.S. Pat. No. 3,115,737, issued Dec. 31, 1963, various prior art roll structures are mentioned and there is shown the combination of a resilient roll and a metal roll having axially spaced ribbed sections. In the U.S. patent to Bornzin, U.S. Pat. No. 2,958,992, issued Nov. 8, 1960, one of the rolls is of elastomer and the other element is of a paddle-wheel configuration. In the Griffiths U.S. Pat. No. Re. 24,973, reissued Apr. 25, 1961, the rolls are symmetrically tapered and formed with spiral grooves. Witt U.S. Pat. No. 3,039,256, issued June 19, 1962, shows two smooth rolls of elastomer. The crop conditioner of Adee and White in U.S. Pat. No. 3,085,384, issued Apr. 16, 1963, comprises a resilient roll with spiral grooves and a second roll made up of circumferentially spaced rods arranged in a herringbone pattern. The Mayer U.S. Pat. No. 3,146,568, issued Sept. 1, 1964, shows rolls provided with hammerhead formations. In the Wood U.S. Pat. Nos. 3,284,875 and 3,412,446, issued Nov. 15, 1966 and Nov. 26, 1968, respectively, the rolls are fluted. In the Praca U.S. Pat. No. 3,712,034, issued Jan. 23, 1973, the end portions of the rolls are of reduced diameter. In the Getz U.S. Pat. No. 2,966,022, issued Dec. 27, 1960, one of the rolls is smooth and the other is formed with shallow grooves. In Heth U.S. Pat. No. 2,921,426, issued Jan. 19, 1960, the rolls are made up of discs.

The prior art patents discussed above are believed to be representative of the state of the art. They represent the results of a reasonably diligent inquiry on the part of the inventors and their assignee and attorneys and include, to the best of their knowledge, the literature most closely related to Applicants' invention and constituting the prior art plateau from which Applicants' invention departs and relative to which Applicants' invention constitutes an improvement.

SUMMARY OF THE INVENTION

The principal object of the invention is to provide an improved conditioning roll structure in which a pair of conditioning rolls, one peripherally rigid and the other peripherally elastic, having complementary ribs of either spiral or herringbone configuration, are timed and synchronized to provide rib-to-rib registry as the rolls rotate with the result that the advantages of both crushing and crimping are simultaneously achieved.

Other objects of the invention are to provide, in a conditioning roll structure, the following: aggressive feeding and stem cracking, strong expression of juices, reasonably smooth operation, freedom from chopping and tearing of the stems and destruction of the leaves, freedom from excessive mangling of the stalks and wrapping of stalks on the rolls, harmless passing of extraneous objects such as pebbles, and rugged construction.

BRIEF DESCRIPTION OF THE DRAWINGS

For a better understanding of the invention together with other and further objects, advantages and capabilities thereof, reference is made to the following description of the accompanying drawings in which:

FIG. 3 is a cross-sectional view taken along section line 3—3 of FIG. 2, looking in the direction of the arrows;

FIG. 4 is a perspective view showing in skeleton form the orientation of the rolls and ribs in the preferred form of roll structure, with explanatory legends relating to conditions of operation;

FIG. 5 is a side elevational view of the roll driving mechanism included in the FIG. 1 conditioner and located in the left side thereof, as viewing FIG. 1;

FIG. 6 is a rear elevational view of the driving mechanism illustrated in FIG. 5; and FIG. 7 is a perspective view, analogous to FIG. 2, showing a modified form of conditioner roll structure in accordance with the invention.

DESCRIPTION OF THE PREFERRED EMBODIMENT OF THE INVENTION

Figure 1:
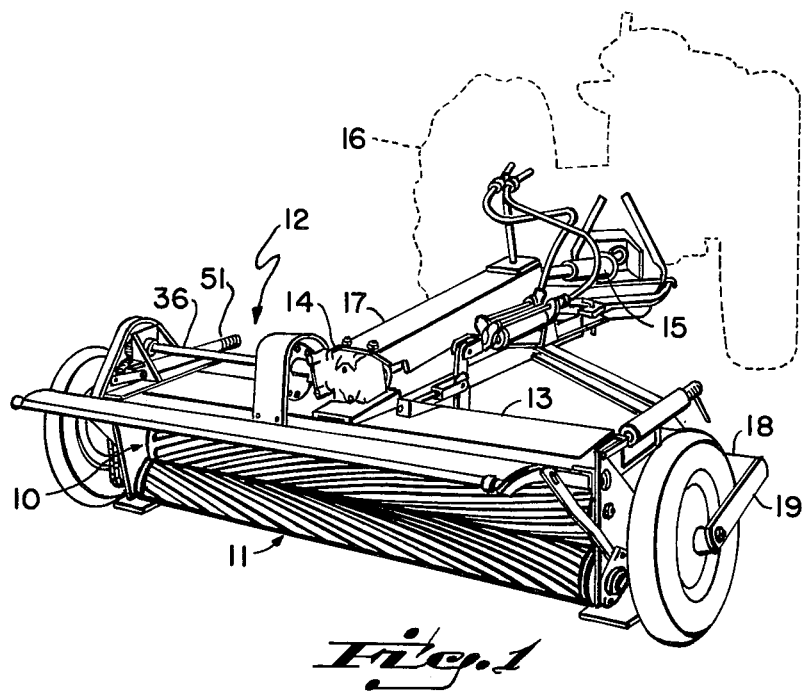
FIG. 1 is a perspective view taken from the rear of a hay conditioner operatively oriented with respect to a tractor, showing the preferred form of conditioning roll structure in accordance with the invention.
Figure 2:
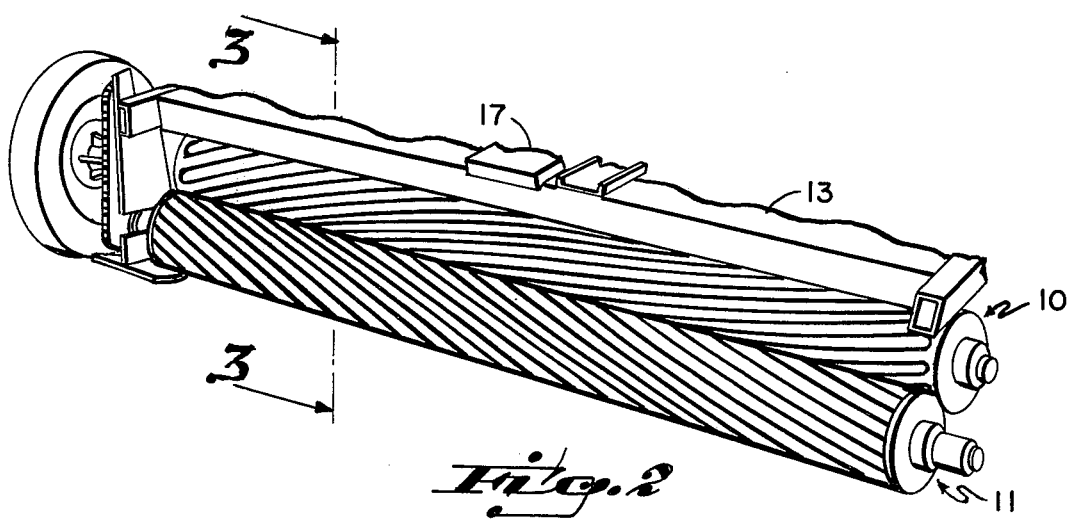
FIG. 2 is a perspective view of the conditioning roll structure of the FIG. 1 hay conditioner, the rolls being enlarged and emphasized.

Now making reference to FIGS. 1 and 2, the preferred form of conditioning roll structure in accordance with the invention comprises the upper resilient roll 10, the lower metallic roll 11, those having registering complementary spiral ribs, and any suitable means for driving the two rolls in synchronism, such for example as the means illustrated in FIG. 5 or any of the well-known conventional means intended for such driving purposes.

Our novel and inventive conditioner roll structure is herein shown in a hay conditioner of the type illustrated in U.S. Pat. No. 2,997,834, issued to Robert P. Harbage and Eugene J. Haupt on Aug. 29, 1961, entitled "Hay Conditioner" and assigned to the same assignee as the present application and invention. This hay conditioner includes the conditioning mechanism generally shown at 12, a main draft frame 13 and power transmitting means 14 adapted to be connected to a power take-off 15 of a tractor 16. A drawbar 17 secures the hay conditioner to the tractor. The conditioner further comprises a wheel support 18, with two end bars 19 adapted to support the conditioning mechanism 12. The conditioning mechanism has a resilient upper roll 10, formed to provide surface elastance and having spiral ribs or lands, such as 20, 21 and 22, between which are grooves or recesses, such as 23 and 24. The mechanism further comprises a lower roll 11, characterized by surface rigidity, which bears complementary spiral ribs or lands, such as 25, 26 and 27, between which are grooves such as 28 and 29. In the specification a roll will be referred to as resilient or rubberlike or elastic, whether the roll is solid or tubular or cored or made in any other fashion, so long as its cylindrical peripheral wall comprises a sufficient depth of resilient material to function in an elastic mode when participating in the conditioning function.

Further, a roll will be referred to in this specification as metallic or rigid whether it is solid or tubular or cored or made in any other fashion, so long as its cylindrical peripheral wall comprises a sufficient thickness of metal or rigid material to function in a rigid mode during the conditioning operation.

Note is made at this point that, in accordance with the invention, the crushing action is provided by the coaction between each land or rib on the upper roll and the corresponding rotationally registering land or rib on the other roll. The roll structure in accordance with the invention is such that the rolls are synchronized or timed by the driving means to present land to land (FIG. 3) and thus to provide a unique dual action, crushing and retaining the aggressive feeding and other advantages of crimping.

The lower roll 11 is positioned in parallelism to and adjustably near surface contact with the upper roll 10. A line normal to and between the axes of the two rolls is approximately at a 28° angle relative to the vertical. The two rolls are mounted with extending shaft portions at their ends, as shown at 30 and 31 in FIG. 5. Secured to the respective shafts 30 and 31 are driving sprockets 32 and 33. The drive for the two rolls is provided by a chain 34, driven from sprocket 35 on power shaft 36. The chain 34 is carried over a tightener 37 and the rolls are rotated in opposite directions, in synchronism, as shown in FIG. 5.

As the FIG. 1 mechanism moves to the right, this corresponding to motion of the FIG. 5 mechanism to the left, the crop swath is picked up from the ground by roll 11, passed between the rolls and crushed by the land-to-land action.

As best shown in FIG. 5, the upper roller shaft is suitably journaled in a pair of swinging members such as that numbered 38, there being one such swinging member at each end of the upper roll shaft. This swinging member is pivotally mounted at 39 relative to the main frame 13. Independently pivotally mounted on the same axis is the arm 40 that carries a rotationally mounted idler 37 which is suitably adjustably biased against the chain 34 by a conventional chain tightener spring 41. The frame carries lugs 42 and 43 and the swinging member carries lugs 44 and 45 and mounted between these pairs of lugs is an adjustable spacer 46, the function of which is to determine the small spacing between the rolls and thus the pressure exerted in the crushing action.

Particular emphasis is again directed to the construction of the rolls 10 and 11 as illustrated in FIG. 3. The lower or rigid metallic roller provides a rigid surface parameter, is cylindrical in shape and is provided with eleven circumferentially equi-spaced bars such as 25, 26 and 27. In practice it has been found that a roller having an 8 inch main diameter and peripheral metallic wall thickness of 0.238 inch provides satisfactory results. The invention is not limited to any of the specific illustrative parameters herein mentioned. A suitable pitch for the spiral formation is 270° per 9' roll. The bars are secured to the roller by welding. They are bars of channel-like section, each having a depth of ½ inch and width of 1⅛ inches. These bars are suitably bent to provide the spiral ribs such as 25, 26 and 27. Between these ribs are alternate grooves such as 28 and 29.

Referring now to the upper resilient roll 10, it is made up of tire carcass material or the like and is provided with eleven integral resilient lugs, such as 20, 21 and 22, each having a depth of ½ inch and a width of 1⅜ inches. The carcass material is of 4 inch thickness on a core element 47. Core 47 has a cylindrical peripheral wall surface depth of metal equal to 0.238 inch.

The drive provided by the FIG. 4 mechanism is such that as the hay conditioner moves to the left (from the point of view of FIG. 4) the material is aggressively clutched or crimped and fed in between the closely spaced registering and coacting lands such, for example, as the rubber rib or land 21 and the metallic rib or land 26, there being provided eleven successive crushing actions per rotation of the rolls. Note that the greatest diameter of each roll, measured from the top surface of each land to the top surface of the land diametrically thereto, is 9 inches, this outermost diameter being equated for both rolls. They are timed in synchronism, so that the crushing action is always land to land, i.e. rib to rib.

Referring now specifically to FIG. 6 it will be understood that the spiral configurations of the ribs in the two rolls are complementary, in the sense that when the spiral of the ribs in the upper roll 10 is to the left the spiral of the rib in the lower roll is complementary or to the right, thus assuring continuity and axial flow in the land-to-land compressing action.

In a hay conditioner in accordance with the invention the crushing and conditioning is substantially the same as that provided by two smooth surface rollers. However, the bite or aggressiveness of feed is far superior to that provided by smooth rollers. The construction in accordance with the invention has an additional advantage in that it is not so susceptible to clogging.

Reference is now made to the alternative form of rib and land configuration illustrated in FIG. 7. In this embodiment the metal lugs or ribs of the lower roller 11 and the integral rubberlike lugs or ribs of the upper roller 10 are arranged in complementary fashion but are in herringbone-like configuration. Again, the crushing action is that of land-to-land or rib-to-rib, analogous to that provided by two smooth rollers. Simultaneously, the clutching action and aggressiveness characteristic of crimping conditioners are achieved. It will be understood that the ribs, such as 49, on resilient roller 10' are integral with the roller and are of herringbone-like configuration. The ribs 50 on roller 11' are provided by welded-on bars. The FIG. 7 embodiment is driven by the FIG. 5–6 type of mechanism so that the operation is rib-on-rib as described above.

In order to increase the crushing action and to bring the rolls closer together the compression on spring 51 is adjustably increased and this tends to swing member 38 couterclockwise, as shown in FIG. 6.

In the embodiment of the invention herein shown each of the rubber lugs is slightly wider than its counterpart registering metallic rib.

If all ribs were parallel to the axes of the rolls, then crushing action would occur throughout the length of any two registering ribs. However, when the ribs are at an angle to such axes the registry provided by each pair of face-to-face ribs moves laterally as the rolls rotate. This is true, whether the ribs are of complementary spiral configuration or of complementary chevron configuration. Hence the generic expression "at an angle to the axis" of the roll is used in the claims hereto annexed.

While there has been shown and described what is at present considered to be the preferred and an optional embodiment of the invention, various changes and modifications, all within the scope of the invention, will be apparent to those of skill in the art. Accordingly it is intended to cover in the appended claims all such modifications and changes as are within the proper scope of the invention.

We claim:

1. In a hay conditioner, the improvement which provides, in combination:
    an upper conditioner roll having an axis and circumferentially spaced radially extending rib formations running at an angle relative to its axis,
    a lower conditioner roll having an axis and circumferentially spaced radially extending ribs running at an angle to the axis of said second roll,
    the formations on the first roll and ribs on the second roll being complementary and in face-to-face symmetrical peripheral registry, the upper roll being of resilient material and the lower roll being of rigid material, the rolls being adjacently disposed,
    and gear means for driving the rolls in timed synchronism so as to maintain said registry.

2. The improvement in accordance with claim 1 in which the ribs and formations on the respective rolls are spiral.

3. The improvement in accordance with claim 1 in which the ribs and formations are in herringbone configuration.

* * * * *